US011338735B2

(12) United States Patent
Hendricks et al.

(10) Patent No.: US 11,338,735 B2
(45) Date of Patent: May 24, 2022

(54) ROTATABLE OUTSIDE MIRROR WITH IMAGER ASSEMBLY

(71) Applicant: Gentex Corporation, Zeeland, MI (US)

(72) Inventors: Michael G. Hendricks, Wyoming, MI (US); Danny L. Minikey, Jr., Fenwick, MI (US); Christopher B. Case, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/084,737

(22) Filed: Oct. 30, 2020

(65) Prior Publication Data

US 2021/0129753 A1 May 6, 2021

Related U.S. Application Data

(60) Provisional application No. 62/928,578, filed on Oct. 31, 2019.

(51) Int. Cl.
| | |
|---|---|
| *B60R 1/072* | (2006.01) |
| *B60R 1/12* | (2006.01) |
| *G02B 7/18* | (2021.01) |
| *G02F 1/153* | (2006.01) |
| *H04N 5/225* | (2006.01) |
| *H04N 5/232* | (2006.01) |
| *H04N 7/18* | (2006.01) |

(52) U.S. Cl.
CPC ................ *B60R 1/072* (2013.01); *B60R 1/12* (2013.01); *G02B 7/1815* (2013.01); *G02F 1/153* (2013.01); *H04N 5/2252* (2013.01); *H04N 5/23299* (2018.08); *H04N 7/183* (2013.01); *B60R 2001/123* (2013.01); *B60R 2001/1215* (2013.01); *B60R 2001/1253* (2013.01)

(58) Field of Classification Search
CPC ... B60R 1/072; B60R 1/12; B60R 2001/1253; B60R 2001/1215; B60R 2001/123; B60R 1/025; B60R 2001/1223; G02B 7/1815; G02B 7/1821; G02F 1/153; H04N 5/2252; H04N 5/23299; H04N 7/183; H04N 5/2257
See application file for complete search history.

(56) References Cited

U.S. PATENT DOCUMENTS

| | | | |
|---|---|---|---|
| 5,096,287 | A | 3/1992 | Kakinami et al. |
| 5,504,478 | A | 4/1996 | Knapp |
| 5,971,553 | A | 10/1999 | Durnwald |

(Continued)

FOREIGN PATENT DOCUMENTS

| | | |
|---|---|---|
| CN | 206926584 U | 1/2018 |
| DE | 102018202387 B3 | 5/2019 |

(Continued)

*Primary Examiner* — James M Pontius
(74) *Attorney, Agent, or Firm* — Price Heneveld LLP; Brian James Brewer (57) ABSTRACT

An exterior mirror assembly for a vehicle includes an arm having a proximal end coupled with a vehicle door and a distal end. A mirror assembly is coupled to the arm. The mirror assembly includes an electro-optic element. The mirror assembly is rotatable about the distal end between first and second positions. An imager is disposed proximate to the distal end and configured to capture image data within a blind spot zone of said vehicle

16 Claims, 9 Drawing Sheets

(56) References Cited

U.S. PATENT DOCUMENTS

| | | | |
|---|---|---|---|
| 6,008,486 A | 12/1999 | Stam et al. |
| 6,087,953 A | 7/2000 | Deline et al. |
| 6,130,448 A | 10/2000 | Bauer et al. |
| 6,140,933 A | 10/2000 | Bugno et al. |
| 6,326,900 B2 | 12/2001 | DeLine et al. |
| 6,366,213 B2 | 4/2002 | DeLine et al. |
| 6,420,800 B1 | 7/2002 | LeVesque et al. |
| 6,483,438 B2 | 11/2002 | DeLine et al. |
| 6,593,565 B2 | 7/2003 | Heslin et al. |
| 6,621,616 B1 | 9/2003 | Bauer et al. |
| 6,631,316 B2 | 10/2003 | Stam et al. |
| 6,963,437 B2 | 11/2005 | Bauer et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,372,611 B2 | 5/2008 | Tonar et al. |
| 7,379,225 B2 | 5/2008 | Fonar et al. |
| 7,417,221 B2 | 8/2008 | Creswick et al. |
| 7,423,821 B2 | 9/2008 | Bechtel et al. |
| 7,452,113 B2 | 11/2008 | Newton et al. |
| 7,477,439 B2 | 1/2009 | Tonar et al. |
| 7,511,872 B2 | 3/2009 | Tonar et al. |
| 7,526,103 B2 | 4/2009 | Schofield et al. |
| 7,543,946 B2 | 6/2009 | Ockerse et al. |
| 7,567,291 B2 | 7/2009 | Bechtel et al. |
| 7,570,413 B2 | 8/2009 | Tonar et al. |
| 7,602,542 B2 | 10/2009 | Tonar et al. |
| 7,630,803 B2 | 12/2009 | Stam et al. |
| 7,719,750 B2 | 5/2010 | Tonar et al. |
| 7,728,721 B2 | 6/2010 | Schofield et al. |
| 7,881,839 B2 | 2/2011 | Stam et al. |
| 7,887,204 B2 | 2/2011 | Zhao |
| 8,004,741 B2 | 8/2011 | Tonar et al. |
| 8,144,223 B2 | 3/2012 | Van Blerkom et al. |
| 8,169,684 B2 | 5/2012 | Bugno et al. |
| 8,836,888 B2 | 9/2014 | Minikey, Jr. et al. |
| 9,199,574 B2 | 12/2015 | Pierce et al. |
| 10,154,200 B2 | 12/2018 | Rycenga et al. |
| 2006/0106518 A1 | 5/2006 | Stam et al. |
| 2007/0171037 A1 | 7/2007 | Schofield et al. |
| 2007/0183068 A1 | 8/2007 | Kozlowski |
| 2009/0190015 A1 | 7/2009 | Bechtel et al. |
| 2009/0303566 A1 | 12/2009 | Tonar et al. |
| 2010/0073480 A1 | 3/2010 | Hoek et al. |
| 2010/0187407 A1 | 7/2010 | Bechtel et al. |
| 2010/0246017 A1 | 9/2010 | Tonar et al. |
| 2010/0321758 A1 | 12/2010 | Bugno et al. |
| 2011/0317242 A1 | 12/2011 | Tonar et al. |
| 2014/0226012 A1 | 8/2014 | Achenbach |
| 2017/0272624 A1 | 9/2017 | Minikey, Jr. et al. |
| 2017/0272633 A1 | 9/2017 | Minikey, Jr. et al. |
| 2018/0091779 A1 | 3/2018 | Hendricks |
| 2020/0156592 A1* | 5/2020 | Zaharia ............... B60R 25/104 |

FOREIGN PATENT DOCUMENTS

| | | |
|---|---|---|
| EP | 937601 A2 | 8/1999 |
| GB | 2480473 A | 11/2011 |
| JP | 2002504038 A | 2/2002 |
| WO | 2004005073 A2 | 1/2004 |

\* cited by examiner

ROTATABLE OUTSIDE MIRROR WITH IMAGER ASSEMBLY

CROSS-REFERENCE TO RELATED APPLICATION

This application claims priority to and the benefit under 35 U.S.C. § 119(e) of U.S. Provisional Application No. 62/928,578, filed on Oct. 31, 2019, entitled "ROTATABLE OUTSIDE MIRROR WITH IMAGER ASSEMBLY," the disclosure of which is hereby incorporated herein by reference in its entirety.

FIELD OF THE DISCLOSURE

The present disclosure generally relates to a mirror, and more particularly to a rotatable outside mirror with an imager assembly.

SUMMARY OF THE DISCLOSURE

According to one aspect of the present disclosure, a monitoring system for a vehicle includes a housing rotatable relative to said vehicle between a horizontal position and a vertical position. A mirror assembly is coupled to the housing. The mirror assembly includes a rearview mirror having a reflective field of view. An imager is disposed between the housing and the mirror assembly. The imager captures image data within a field of view. A controller is communicatively coupled to the imager. The controller receives captured image data from the imager. A display assembly is communicatively coupled to the controller. The controller converts the image data for display on the display assembly.

According to another aspect of the present disclosure, an exterior mirror assembly for a vehicle includes an arm having a proximal end coupled with a vehicle door and a distal end. A mirror assembly is coupled to the arm. The mirror assembly includes an electro-optic element. The mirror assembly is rotatable about the distal end between first and second positions. An imager is disposed proximate to the distal end and configured to capture image data within a blind spot zone of said vehicle.

According to yet another aspect of the present disclosure, a mirror assembly includes a support feature having a first end and a second end. A mirror assembly is rotatably coupled to the second end of the support feature. The mirror assembly includes an electro-optic element. The mirror assembly is rotatable between a first position having a first reflective field of view and a second position having a second reflective field of view. An imager is coupled to the support feature and configured to capture image data through the mirror assembly.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a rotatable outside mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
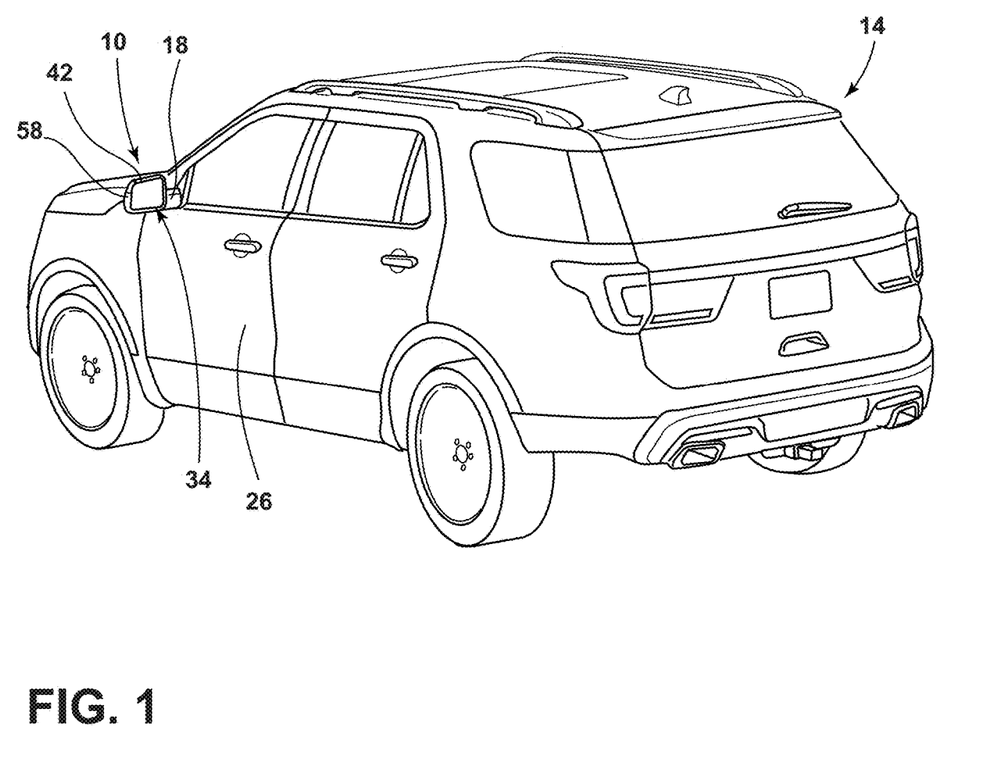
FIG. 1 is a side perspective view of a vehicle that includes an exterior mirror assembly, according to the present disclosure.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-11, reference numeral 10 generally designates an exterior mirror assembly for a vehicle 14 that includes a support feature, such as an arm 18 that has a proximal end 22 coupled with a vehicle door 26 and a distal end 30. A mirror assembly 34 is coupled to the arm 18. The mirror assembly 34 includes an electro-optic element 38. The mirror assembly 34 is rotatable about the distal end 30 between first and second positions 42, 46. An imager 50 is disposed proximate the distal end 30 and configured to capture image data within a blind spot zone 54 of the vehicle 14.

Figure 2:
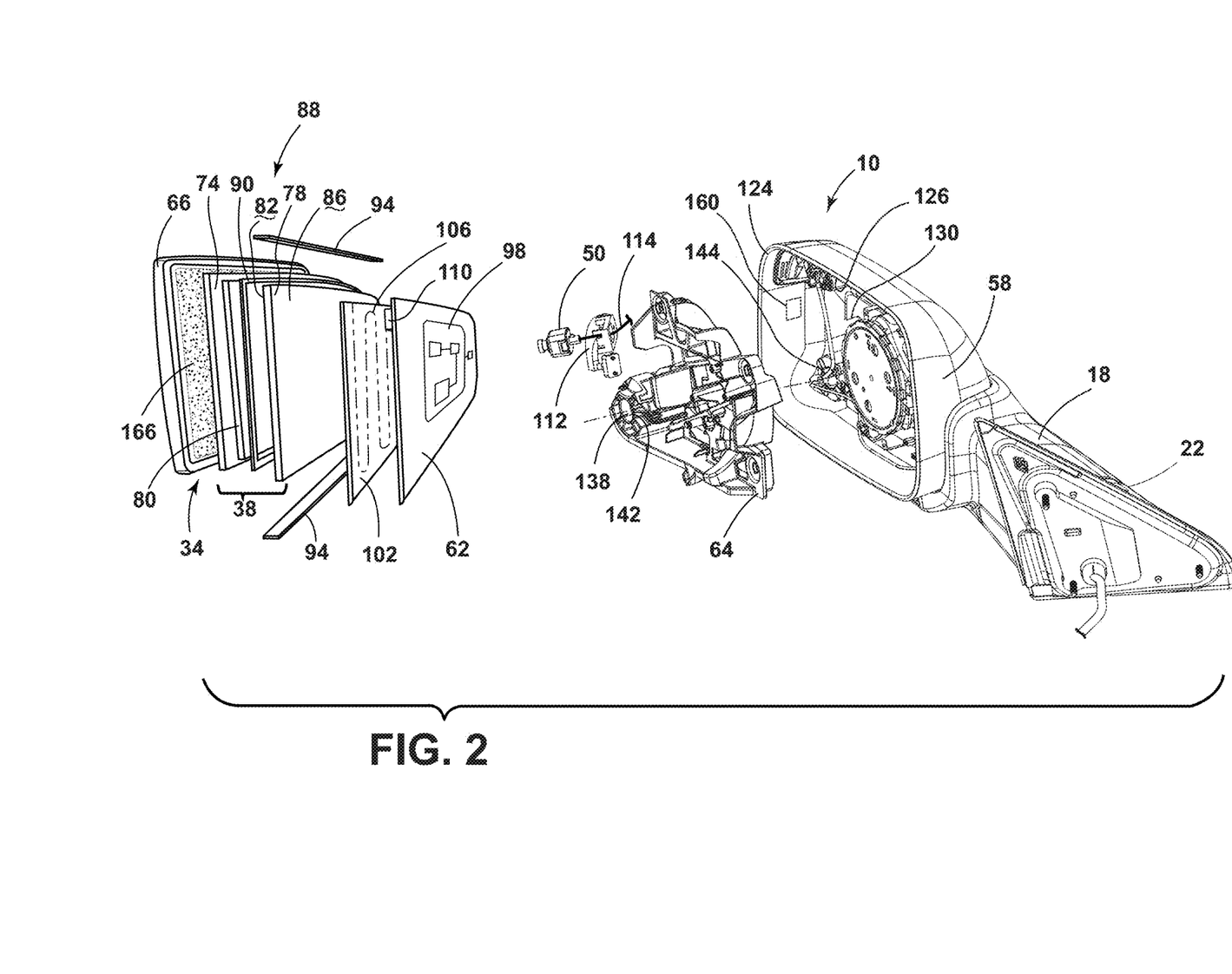
FIG. 2 is a side perspective exploded view of an exterior mirror assembly, according to the present disclosure.
Figure 3:
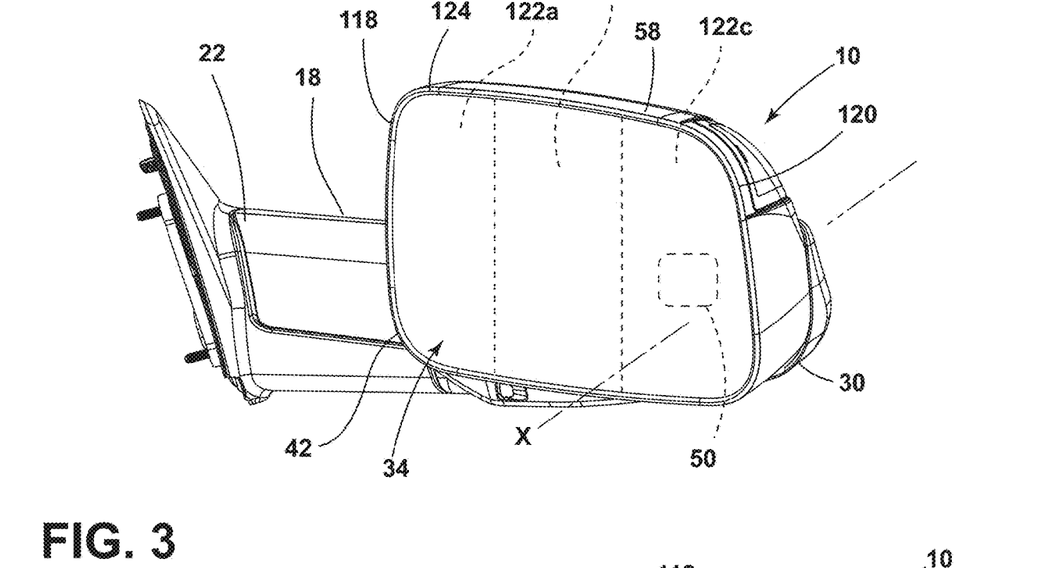
FIG. 3 is a front perspective view of an exterior mirror assembly in a first position, according to the present disclosure.

Referring to FIGS. 1 and 2, the exterior mirror assembly 10 includes a housing 58 configured to shield and protect the electro-optic element 38. It is contemplated that the exterior mirror assembly 10 may be a standard reflective mirror. The exterior mirror assembly 10 may also include a circuit board, a carrier plate 62, a bracket 64, and a bezel 66. Although a bezel 66 is shown in FIG. 2, the exterior mirror assembly 10 may be free of the bezel 66. The exterior mirror assembly 10 may be held together by a snap-fit connection, an interference-fit connection, mechanical fasteners, and/or adhesives. The arm 18 extends outwardly from the vehicle door 26 as the housing 58 may be operably coupled with the distal end 30 of the arm 18. The vehicle 14 may be a sedan, a sport utility vehicle, a van, a truck, a crossover, or another style vehicle 14. Additionally, the vehicle 14 may be utilized for personal and/or commercial purposes.

According to various aspects, the electro-optic element 38 may be made of glass or any other material and/or material combinations configured for use in external mirror applications. The electro-optic element 38 can have any contour, including flat, aspheric, or convex, depending on the selected type of reflection. Additionally or alternatively, the electro-optic element 38 can be an electrochromic mirror having first and second substrates 74, 78 with an electro-optic material disposed therebetween. It is contemplated that a front surface 82 or a rear surface 86 of the second substrate 78 may include a reflective layer configured to display a reflection through the electro-optic material and the first substrate 74. Additionally or alternatively, a front surface or a rear surface of the first substrate 74 may include the reflective layer. In this way, the electro-optic element 38 defines a reflecting surface that provides a user with a rearview of the vehicle 14. A seal 90 extends around the periphery of the first and second substrates 74, 78 thereby sealing an electro-optic material between the first and second substrates 74, 78. An electrical connector, such as a j-clip or bus bar 94 is disposed proximate top and bottom edges of the first and second substrates 74, 78 to selectively apply a voltage to the electro-optic material. Selective application of voltage or reduction of voltage results in darkening and lightening of the electro-optic material between the first substrate 74 and the second substrate 78 resulting in the appearance of a dimming mirror.

A border of the mirror assembly 34 may incorporate a peripheral concealing layer or edge treatment, such as a chrome ring or other similar finish, to conceal a peripheral area of elements located behind the first substrate 74 in the mirror assembly 34, including without limitation a seal on an electro-optic element 38, an applique, foam adhesive, or pad printing. For example, the peripheral concealing layer may be advantageous for concealing the bus bar 94 disposed proximate top and bottom edges of the first and second substrates 74, 78.

Referring again to FIG. 2, the exterior mirror assembly 10 may include electronic components 98 and a heater 102, which can extend across a portion, or substantially all, of the rear surface 86 of the second substrate 78. The heater 102 includes a conductive track 106 that is illustrated in a serpentine configuration across the rear surface 86 of the second substrate 78. A heat conductor 110 may be in communication with the conductive track 106. The electronic components 98 may enable the heat conductor 110, which may be advantageous for removing moisture, such as snow or fog from the electro-optic element 38. The heat conductor 110 operates to heat the electro-optic element 38, which can result in increased performance of the electro-optic element 38.

The carrier plate 62 supports the electro-optic element 38 and may be formed of molded plastic. The carrier plate 62 may be disposed between the heater 102 and the housing 58. In various examples, electronic components 98, such as a printed circuit board, may be arranged on the carrier plate 62, such that a mass of the electronic components 98 is proximate a center of gravity of the mirror assembly 34 to minimize vibration of the exterior mirror assembly 10 after installation onto the vehicle 14 (FIG. 1). The electronic components 98 may be configured as a flexible circuit board or a rigid circuit board, which may have electrical leads printed thereon. As illustrated in FIG. 2, the carrier plate 62 covers substantially an entire rear surface of the electro-optic element 38.

In various examples, the exterior mirror assembly 10 includes the bracket 64, which may extend all the way, or partially, across an inner surface of the housing 58. In various examples, the bracket 64 defines a space proximate the distal end 30 (FIG. 3) to accommodate the imager 50 and a support bracket 112 that extend from the arm 18 toward the mirror assembly 34. To connect the components of the exterior mirror assembly 10, an adhesive liquid, an adhesive tape, or adhesive film, such as double-sided foam adhesive tape, may be provided between the carrier plate 62 and the and the bracket 64 and attached over the carrier plate 62.

The imager 50 may be coupled to the arm 18, such that the imager 50 does not rotate with the mirror assembly 34. In various examples, the imager 50 may be at least partially disposed between the housing 58 and the mirror assembly 34. The imager 50 may be coupled to the support bracket 112 and the support bracket 112 may be coupled to the arm 18. A power and/or data line 114 may extend from the imager 50 along and/or through the arm 18 and is operably coupled with a power source and/or a data source of the vehicle 14. The imager 50 may be a camera or other vision-based device. The imager 50 may be an area-type imager, such as a charge-coupled device (CCD) or a complementary metal-oxide semiconductor (CMOS) imager. The imager 50 may be configured to capture image data in a vehicle-rearward direction, vehicle-side direction, or vehicle-forward direction of the exterior mirror assembly 10. The housing 58 can protect the electro-optic element 38, the imager 50, and other components of the exterior mirror assembly 10 from the elements and possible damage during regular use.

Figure 4:
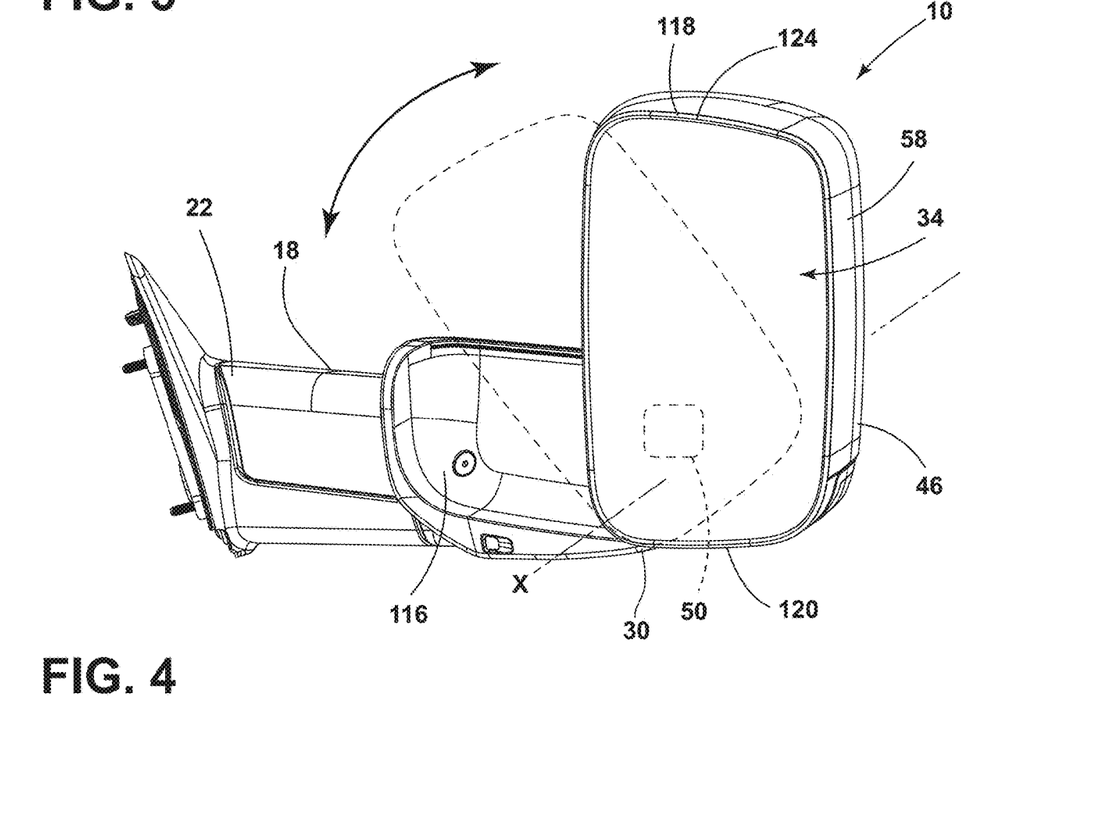
FIG. 4 is a front perspective view of an exterior mirror assembly in a second position, according to the present disclosure.

Referring to FIGS. 3 and 4, the mirror assembly 34 and the housing 58 are configured to rotate about the distal end 30 of the arm 18 between the first and second positions 42, 46. As illustrated in FIG. 3, when in the first position 42, a longitudinal extent of the mirror assembly 34 is in a substantially horizontal position. When in the first position 42, the longitudinal extent of the mirror assembly 34 is substantially parallel with the arm 18 and provides a substantially horizontal reflection.

As illustrated in FIG. 4, the longitudinal extent of the mirror assembly 34 is rotated to be substantially vertical when the mirror assembly 34 is in the second position 46. In this instance, the longitudinal extent of the mirror assembly 34 is generally perpendicular to the arm 18. Additionally or alternatively, when in the second position 46, the mirror assembly 34 and/or the housing 58 may extend outwardly from the distal end 30 of the arm 18. Moreover, the mirror assembly 34 provides a greater vertical reflection when in the second position 46 as compared to the first position 42. The mirror assembly 34 may rotate vertically away from the vehicle door 26 (FIG. 1) about a horizontal axis X to the second position 46, which can provide for at least a portion of the mirror assembly 34 to extend outwardly, beyond the distal end 30 of the arm 18.

Referring again to FIGS. 3 and 4, the arm 18 may define a receiving portion 116 that receives the housing 58 when the housing 58 is in the first position 42. As the housing 58 and the mirror assembly 34 rotate to the second position 46, the housing 58 rotates out of the receiving portion 116. Accordingly, when the housing 58 and the mirror assembly 34 rotate to the first position 42, the housing 58 abuts a surface defining the receiving portion 116. The receiving portion 116 may provide stability to the housing 58 when in the first position 42. In operation, the housing 58 and/or the mirror assembly 34 rotate about the horizontal axis X. The horizontal axis X extends through the arm 18, the housing 58, and the mirror assembly 34. In this way, the horizontal axis X extends through the arm 18, the housing 58, and the mirror assembly 34 and is generally orthogonal thereto.

Referring to FIGS. 3 and 4, the housing 58 includes a first edge 118 and a second edge 120. The second edge 120 is disposed proximate the distal end 30 of the arm 18 and the first edge 118 opposes the second edge 120. When the exterior mirror assembly 10 is in the first position 42, the first and second edges 118, 120 of the housing 58 are generally horizontally aligned with one another. As the exterior mirror assembly 10 rotates from the first position 42 to the second position 46, the first edge 118 moves to an elevated position and the second edge 120 moves to a lowered position. The second edge 120 can remain in contact with the arm 18, while the second edge 120 is spaced-apart from the arm 18. When the exterior mirror assembly 10 is in the second position, the first and second edges 118, 120 are generally vertically aligned with the first edge 118 disposed vertically above the second edge 120.

Referring to FIGS. 3-5B, when the mirror assembly 34 is in the first position 42, the mirror assembly 34 includes a first viewing area 122a, a second viewing area 122b, and a third viewing area 122c. The first viewing area 122a is adjacent to the first edge 118 of the housing 58, the third viewing area 122c is adjacent to the second edge 120 of the housing 58, and the second viewing area 122b is centrally located between the first and third viewing areas 122a, 122c. When the mirror assembly 34 is in the first position 42, the mirror assembly provides a greater horizontal reflection, and when the mirror assembly 34 is in the second position, 46 the mirror assembly provides a greater vertical reflection.

Figure 5A:
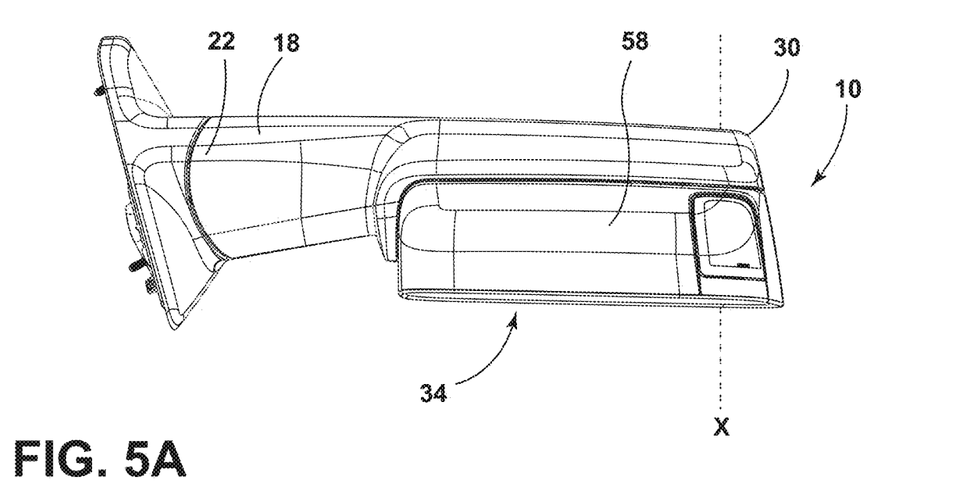
FIG. 5A is a top plan view of a rotational axis of an exterior mirror assembly, according to the present disclosure.
Figure 5B:
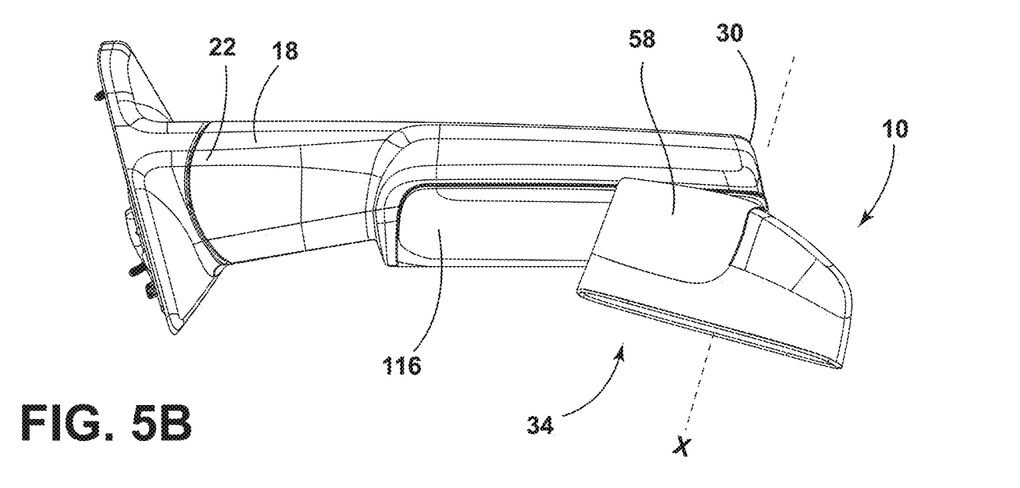
FIG. 5B is a top plan view of an additional rotational axis of an exterior mirror assembly, according to the present disclosure.

The horizontal axis X can be oriented at different angles relative to the arm 18. In a non-limiting example, as illustrated in FIG. 5A, the horizontal axis X may be substantially orthogonal to the arm 18. In such examples, the vertical reflection may generally align with reflection from the third viewing area 122c and at least a portion of the second viewing area 122b of the mirror assembly 34. In another non-limiting example, as illustrated in FIG. 5B, the horizontal axis X can extend at an angle relative to the arm 18, such that the horizontal axis X extends through the arm 18 at a first location and through the mirror assembly 34 at a second location, where the first location is a greater distance from the vehicle 14 than the second distance. In this way, the horizontal axis X extends at an angle toward the vehicle 14 in a vehicle-forward to a vehicle-rearward direction. The angled horizontal axis X can result in the mirror assembly 34 being angled toward the driver when in the second position 46. The angled second position 46 may capture a vertical reflection that aligns with more of the second viewing area 122b. This configuration can allow for a wider reflection from the mirror assembly 34 when the mirror assembly 34 is in the second position 46.

According to various aspects, the mirror assembly 34 is coupled to the housing 58. The housing 58 includes a peripheral edge 124 that defines an opening 126 (FIG. 2), and the mirror assembly 34 is coupled to the peripheral edge 124. In non-limiting examples, the mirror assembly 34 may be coupled to the entire peripheral edge 124 and fill the opening 126 defined by the peripheral edge 124. In this way, the mirror assembly 34 may be a single reflective component disposed within the opening 126 of the housing 58. The single reflective component may be advantageous for reducing the size of the exterior mirror assembly 10. In such examples, the mirror assembly 34 may be free of reflective spotter capabilities. Moreover, the first and/or second substrates 74, 78, and accordingly the mirror assembly 34, can each be substantially flat and/or planar. Accordingly, the mirror assembly 34 includes a generally planar outer surface.

Figure 6:
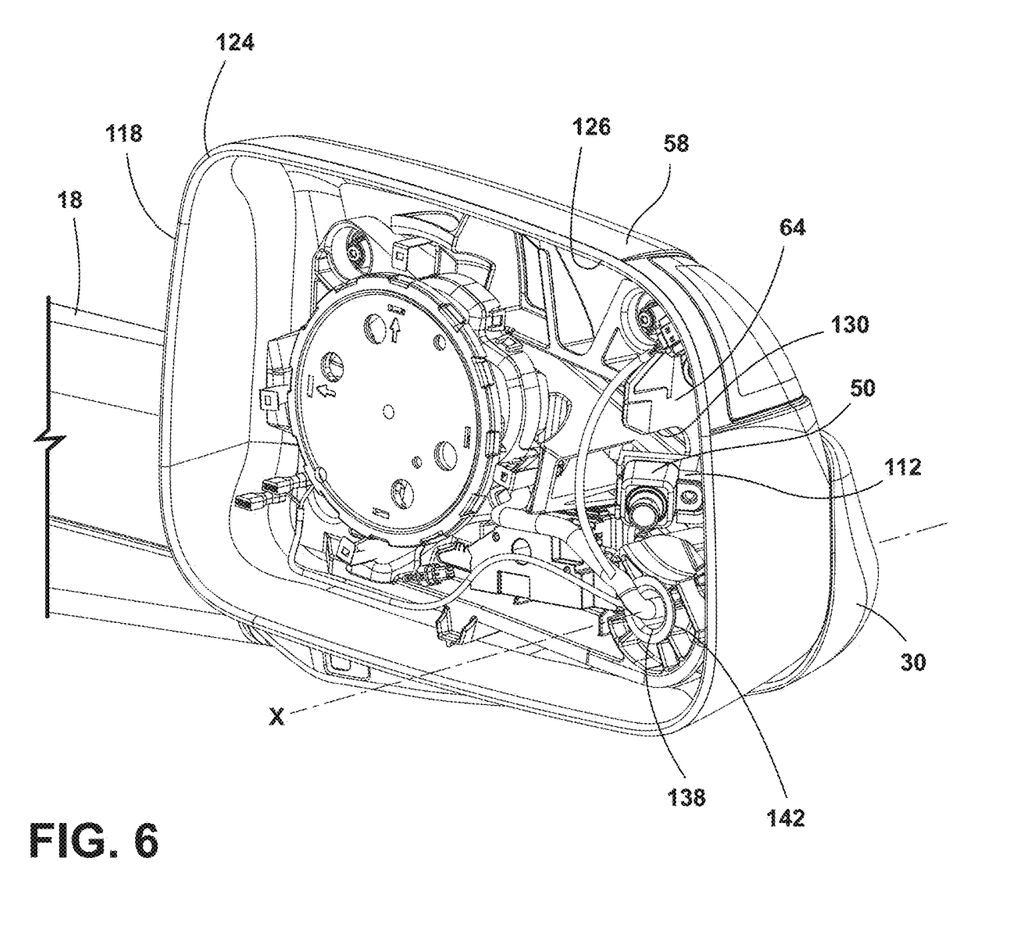
FIG. 6 is a front perspective view of an imager in an exterior mirror assembly with a mirror assembly removed, according to the present disclosure.

Referring to FIG. 6, the imager 50 is coupled to the arm 18 and extends at least partially between the housing 58 and the mirror assembly 34 (FIG. 2). In various examples, the housing 58 defines an aperture 130 proximate the arm 18 and the imager 50 is disposed within the aperture 130. The aperture 130 may be sized to accommodate the imager 50 while the housing 58 rotates around the imager 50 between the first and second positions 42, 46 (FIGS. 3 and 4) while the imager 50 remains substantially stationary on the arm 18. In this way, the aperture 130 can be any size and/or shape to allow the housing 58 to rotate with minimal, or no, interference with the imager 50.

As illustrated in FIG. 6, a pivot member 138 is coupled to the arm 18 and extends through an aperture 142 defined by the carrier plate 62 and a corresponding aperture 144 defined by the housing 58. The pivot member 138 may be coupled to the arm 18 and extend outward in a vehicle-rearward direction therefrom. The housing 58 and the carrier plate 62 may be rotatably coupled to the arm 18 via the pivot member 138. According to various aspects, the imager 50 may be coupled to the arm 18 proximate the pivot member 138 and, accordingly, proximate the horizontal axis X. The pivot member 138 may be advantageous for providing an electrical connection interface between the vehicle 14 and the various electrical components within the exterior mirror assembly 10. In this way, the power and/or data line 114 may extend from the imager 50 through the pivot member 138 and at least partially through the arm 18 to connect to the power source and/or data source of the vehicle 14 (FIG. 2).

Figure 7A:
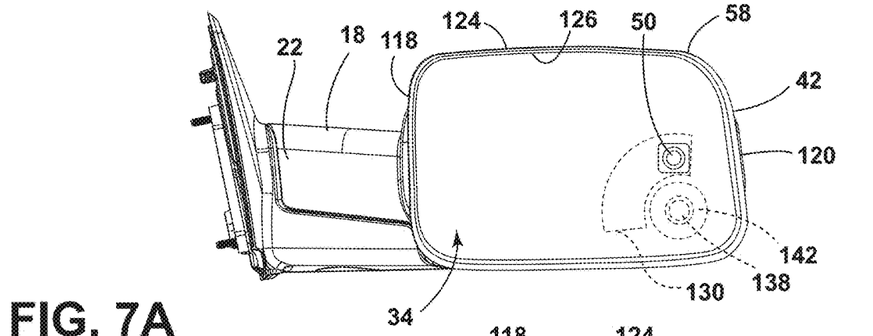
FIG. 7A is a schematic view of a rotatable exterior mirror assembly with an imager of the present disclosure, with the exterior mirror assembly in a first position.
Figure 7B:
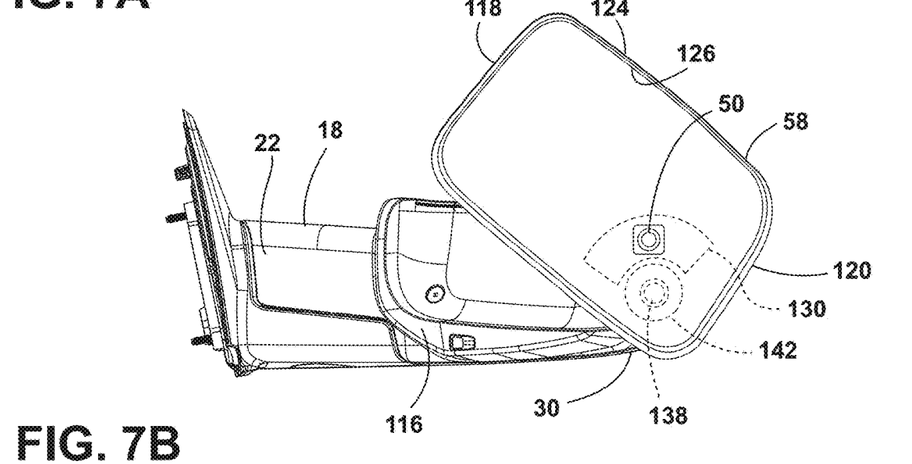
FIG. 7B is a schematic view of a rotatable exterior mirror assembly with an imager of the present disclosure, with the exterior mirror assembly in a transitioning intermediate position.
Figure 7C:
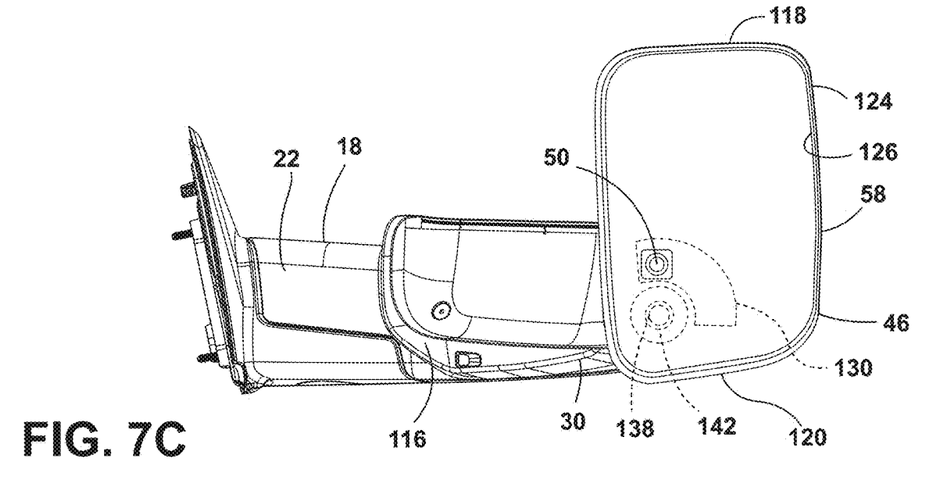
FIG. 7C is a schematic view of a rotatable exterior mirror assembly with an imager of the present disclosure, with the exterior mirror assembly in a second position.
Figure 8A:
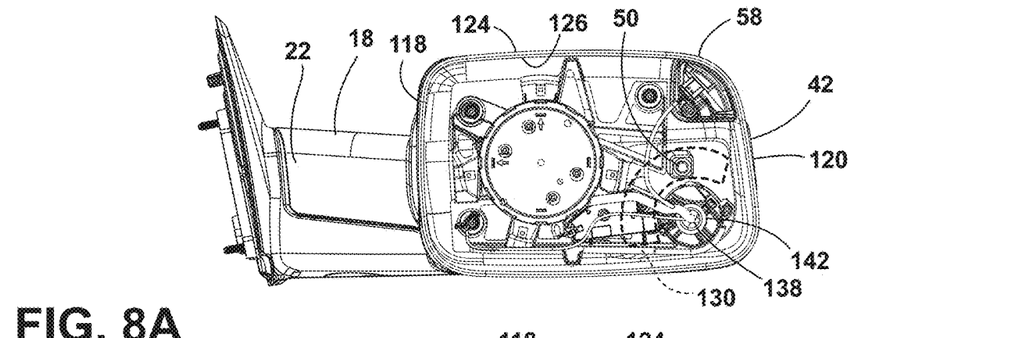
FIG. 8A is a front plan view of an imager in an exterior mirror assembly of the present disclosure in a first position, with a mirror assembly removed.
Figure 8B:
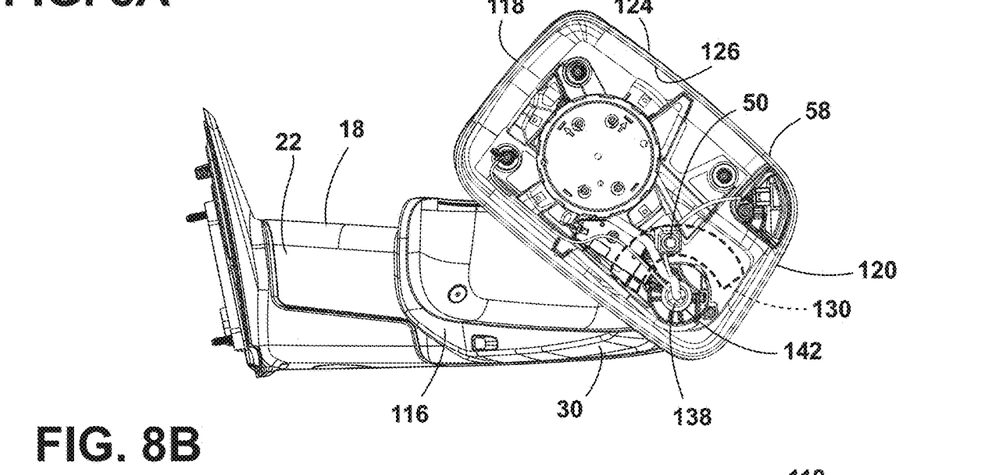
FIG. 8B is a front plan view of an imager in an exterior mirror assembly of the present disclosure in a transitioning intermediate position, with a mirror assembly removed.
Figure 8C:
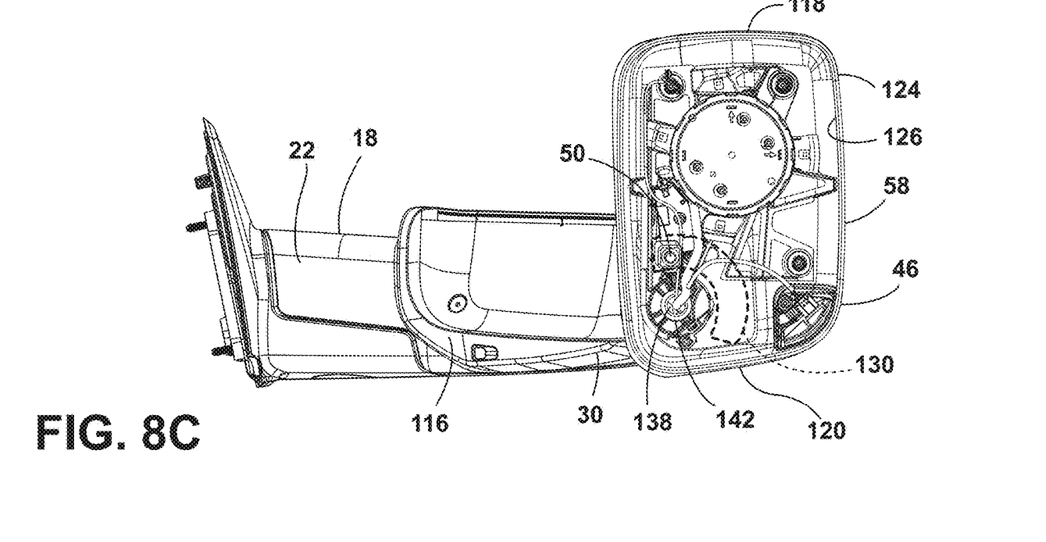
FIG. 8C is a front plan view of an imager in an exterior mirror assembly of the present disclosure in a second position, with a mirror assembly removed.

As illustrated in FIGS. 7A-8C, the housing 58 is configured to rotate and the imager 50 remains stationary on the arm 18. FIGS. 7A-7C illustrate a schematic view of the rotation of the housing 58 around the imager 50, while FIGS. 8A-8C illustrate the rotation of the housing 58 in detail. The aperture 130 generally defines an arc shape that extends around a portion of the pivot member 138. In a non-limiting example, the aperture 130 generally forms approximately a quarter of a circle or an oblong shape. When the housing 58 is in the first position 42, as illustrated in FIGS. 7A and 8A, the imager 50 may be disposed in a first end 132 of the aperture 130. As the housing 58 rotates between the first and second positions 42, 46, as illustrated in FIGS. 7B and 8B, the housing 58 rotates in a manner to move the aperture 130 around the imager 50.

When the housing 58 is in the second position 46, as illustrated in FIGS. 7C and 8C, the housing 58 has shifted such that the imager 50 is disposed in a second end 134 of the aperture 130. Based on the position of the housing 58, the imager 50 can be disposed in the first end 132 of the aperture 130, the second end 134 of the aperture 130, or at any position therebetween. The aperture 130 allows the housing 58 to rotate around the stationary imager 50 without the imager 50 interfering with the rotation of the housing 58. The arc shape of the aperture 130 may be advantageous for providing space for the imager 50 while the housing 58 rotates while minimizing the area that air can enter the housing 58 from a space between the housing 58 and the arm 18.

The size and shape of the aperture 130 may minimize an opening or space around the imager 50 to reduce dirt, debris, and other environmental conditions from entering the housing 58 through the aperture 130. Additionally or alternatively, a cover, membrane, or other protective element may be coupled to the housing 58 and extend into the aperture 130 to minimize or reduce dirt, debris, and other environmental conditions from entering the interior of the exterior mirror assembly 10. It is contemplated that the protective element may be deformable or adjustable to allow the protective element to move around the imager 50 as the housing 58 rotates between the first and second positions 42, 46.

According to various aspects, electrical connectors from a variety of features within the exterior mirror assembly 10 may be routed around the aperture 130 through the pivot member 138. The electrical connectors can be coupled to the housing 58 to clear the space proximate the aperture 130. This configuration may be advantageous to prevent the electrical connectors from impeding the rotation of the housing 58 and/or interfering with the imager 50. The electrical connectors may be positioned in a manner such that the electrical connectors do not interfere with the imager 50 when the housing 58 is in the first position 42, the second position 46, or any position therebetween.

Referring to FIGS. 2 and 7A-8C, due to the aperture 130 in the housing 58, air can flow from between the housing 58 and the arm 18 to inside the housing 58. In this way, the imager 50 may be subject to various weather conditions, such as colder temperatures. The heater 102 may be operably coupled to the imager 50 to provide heat to the imager 50. Additionally or alternatively, the heater 102 can operate to heat the space within the housing 58, which may sufficiently warm the imager 50. The heater 102 may continually provide heat, either directly or indirectly, to the imager 50 when the temperature is at or below a predetermined temperature. A temperature sensor coupled to the exterior mirror assembly 10, or otherwise coupled to the vehicle 14 (FIG. 1), may sense the ambient temperature. A controller 162 (FIG. 8) may compare the sensed temperature with a predetermined temperature and activate the heater 102 when the sensed temperature is at or below the predetermined temperature. In this way, the heater 102 may warm the imager 50, which can reduce, or prevent, the formation of condensation on the imager that can affect the quality of the captured image data. The use of the heater 102 to warm the imager 50 may reduce the volume of components within the exterior mirror assembly 10. Additionally or alternatively, the exterior mirror assembly 10 may include additional components in thermal communication with the imager 50 to protect the imager 50 from the colder temperatures.

Figure 9:
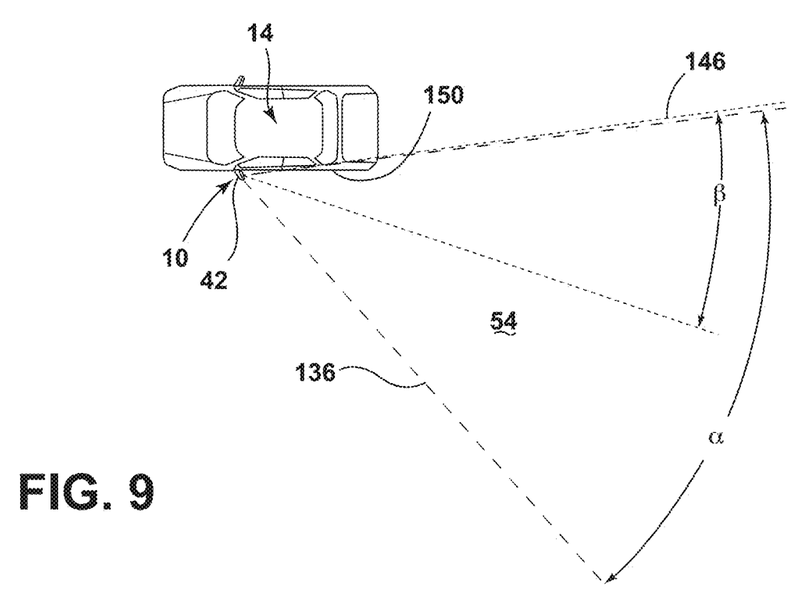
FIG. 9 is a top plan view of a vehicle of the present disclosure illustrating the field of views of a mirror assembly and an imager of an exterior mirror assembly, with the exterior mirror assembly in a first position.

Referring to FIGS. 2, 6, and 9, the imager 50 defines the field of view 136 that extends through the mirror assembly 34 in a vehicle-rearward direction. The field of view 136 of the imager 50 extends through the front and rear surfaces 82, 86 of the second substrate 78, through the electro-optic material, and through front and rear surfaces of the first substrate 74. As such, the mirror assembly 34 extends through the field of view 136 and is configured to not substantially interfere with the field of view 136. It is contemplated that the imager 50 is configured to adjust in response to the dimming or lightening of the electro-optic element 38.

In various examples, the mirror assembly 34 may include a reflective or transflective coating that provides for the reflective capabilities of the mirror assembly 34 while minimizing interference with the field of view 136 of the imager 50. The reflective coating may be applied to all, or a portion, of the mirror assembly 34. In examples where the reflective coating covers a portion of the mirror assembly 34, the portion coincides with the field of view 136 when the mirror assembly 34 is in the first position 42, the second position 46, and any position therebetween. In various examples, the reflective coating can mirror the size and/or shape of the aperture 130. Positioning the imager 50 proximate the horizontal axis X reduces the area of the mirror assembly 34 that extends through the field of view 136, which may be advantageous for improving the accuracy of the field of view 136 and the captured image data.

Additionally or alternatively, the mirror assembly 34 may also include a masking layer made of a thin material, which has a black matte material covering a portion of the mirror assembly 34. The masking layer may reduce visibility through the mirror assembly 34 to components located within the housing 58. The masking layer may be made with any light-absorbing material, such as black paint, black tape, black foam backing, black ink, or the like. The portion of the mirror assembly 34 that is in the field of view 136 of the imager 50 when the mirror assembly 34 is in the first position 42, in the second position 46, or any position between the first and second positions 42, 46 may not include the masking layer. Accordingly, the masking layer does not impinge on the field of view 136 of the imager 50 or the image data obtained by the imager 50 in the field of view 136.

Referring to FIG. 9, the mirror assembly 34 provides a reflected image to a driver. The reflected image corresponds with a field of view 146 of the mirror assembly 34, which encompasses an area a adjacent to and behind the vehicle 14. The area a can include a side 150 of the vehicle 14. The blind spot zone 54 is defined outwardly of the field of view 146. According to various aspects, the field of view 136 of the imager 50 at least partially overlaps the field of view 146 of the mirror assembly 34. The imager 50 includes the field of view 136, which encompasses an area β that completely, or at least partially, encompasses the blind spot zone 54 of the vehicle 14 and/or the field of view 146. The field of view 136 of the imager 50 extends outwardly from the field of view 146 of the mirror assembly 34, and away from the vehicle 14. When an object is in the blind spot zone 54, the object may not be visible to the driver on the reflective surface of the mirror assembly 34 (e.g., within the field of view 146), but the object may be in the field of view 136 of the imager 50. The imager 50 can capture image data of the object within the blind spot zone 54. It is contemplated that the field of view 146 of the mirror assembly 34 and the field of view 136 of the imager 50 may extend indefinitely.

Figure 10:
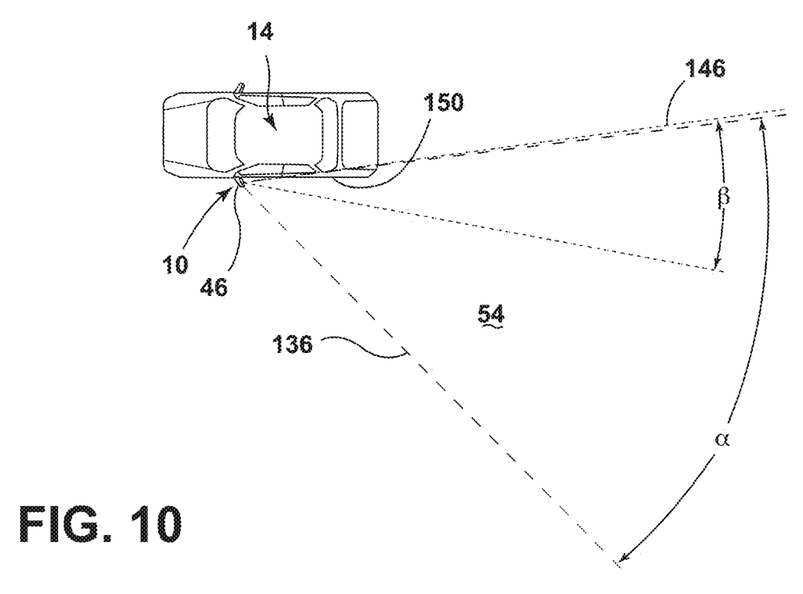
FIG. 10 is a top plan view of a vehicle of the present disclosure illustrating the field of views of a mirror assembly and an imager of an exterior mirror assembly, with the exterior mirror assembly in a second position.

Referring to FIGS. 9 and 10, the mirror assembly 34 defines the field of view 146 when the mirror assembly 34 is in the first position 42 and second position 46. The field of view 146 may differ when the mirror assembly 34 is in the second position 46 relative to when the mirror assembly 34 is in the first position 42. The reflected image can have a greater horizontal reflection when the mirror assembly 34 is in the first position 42 and a greater vertical reflection when in the second position 46. The field of view 146 may also differ based on the angle of reflection visible to the driver when the mirror assembly 34 is in different positions relative to the vehicle 14.

Referring again to FIGS. 3, 4, 9, and 10, the field of view 136 of the imager 50 remains constant (e.g., is generally the same) when the mirror assembly 34 is in the first position 42, as illustrated in FIG. 9, and when the mirror assembly 34 is in the second position 46, as illustrated in FIG. 10. When in the first position 42, the second position 46, and any position therebetween, the field of view 136 of the imager 50 at least partially, or completely, overlaps the blind spot zone 54 of the vehicle 14. The field of view 136 remains substantially constant as the housing 58 and the mirror assembly 34 rotate around the imager 50 between the first and second positions 42, 46. In this way, the imager 50 may continually capture the image data in the blind spot zone 54 without substantial interference from the rotation of the mirror assembly 34.

Figure 11:
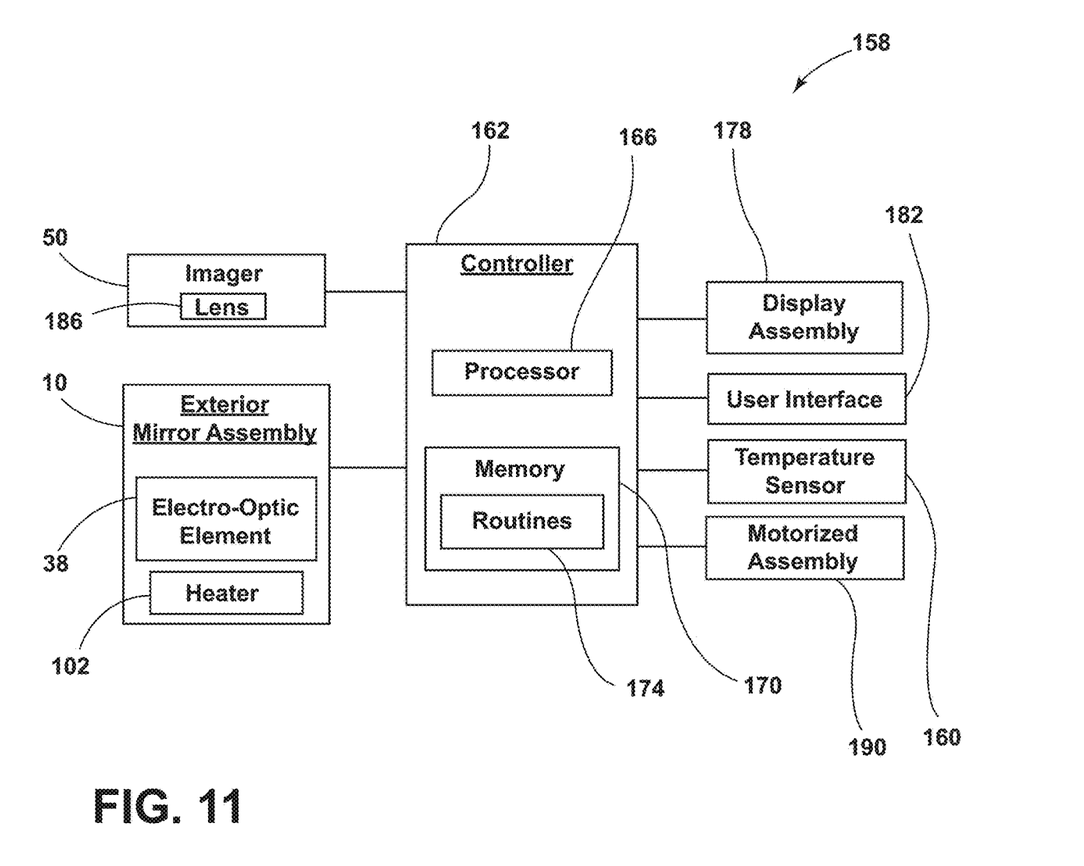
FIG. 11 is a block diagram of a monitoring system of a vehicle, according to the present disclosure.

Referring to FIG. 11, in various examples, the vehicle 14 may include a monitoring system 158. The monitoring system 158 may be advantageous for providing and/or displaying the captured image data from the imager 50 to the driver and/or an occupant of the vehicle 14. The vehicle 14 includes a controller 162 that has a processor 166, a memory 170, and other control circuitry. Instructions or routines 174 are stored within the memory 170 and executable by the processor 166. The controller 162 may be a primary vehicle control (e.g., an electronic control unit), or alternatively, may be a designated controller 162 for the monitoring system 158. The controller 162 may be in communication with various devices that may be incorporated within the vehicle 14 via a communication bus or any other suitable communication interface. The controller 162 may correspond to one or more processors or circuits, which may be configured to process the captured image data received from the imager 50. In this way, the captured image data is communicated from the imager 50 to the controller 162 and the controller 162 processes the captured image data with one or more algorithms (e.g., routines 174).

The controller 162 may further be in communication with a display assembly 178 of the vehicle 14. The display assembly 178 may be coupled to the vehicle 14 and viewable by the driver. The controller 162 is configured to display the captured image data received from the imager 50, such that the driver can view the captured image data and, accordingly, view the object with the blind spot zone 54 (FIGS. 9 and 10). Additionally or alternatively, the controller 162 is configured to receive the captured image data from the imager 50 and convert the captured image data to pixels for display on the display assembly 178. The display assembly 178 may be configured as, or incorporated in, a center stack display, a rearview mirror display assembly 178, an external mirror assembly, a removable display, or another display unit within a vehicle 14. In a non-limiting example, the first viewable area 122a can be selectively operated as the display assembly 178 to display the captured image data to the driver.

According to various aspects, the captured image data is communicated to the display assembly 178, which allows the driver of the vehicle 14 to view the captured image data while the vehicle 14 is operating. In this way, the imager 50 allows the driver to view the blind spot zone 54 of the vehicle 14. Stated differently, the driver of the vehicle 14 can view the field of view 146 through the reflective surface of the mirror assembly 34, as well as, the blind spot zone 54 within the field of view 136 captured by the imager 50 and displayed on the display assembly 178.

It is generally contemplated that the imager 50 may be selectively activated and deactivated by one of the occupants within the vehicle 14. The activation and deactivation may be selected by the occupant through a manual, verbal, or gesture command inside the vehicle 14 through a user interface. When activated, the captured image data may be sent from the imager 50 to the controller 162, which may then convert the captured image data to pixels for display on the display assembly 178. When deactivated, the imager 50 does not capture image data within the blind spot zone 54 to be displayed to the driver on the display assembly 178.

The controller 162 is also in communication with the mirror assembly 34. The controller 162 is configured to operate the electro-optic element 38 of the mirror assembly 34. In various examples, the electro-optic element 38 is configured to darken in response to a signal from the controller 162. The controller 162 may receive a signal from a user interface or from various sensors within the vehicle 14 to activate and darken the electro-optic element 38. Additionally or alternatively, the controller 162 may receive a signal from the user interface or from the various sensors to deactivate the electro-optic element 38 and thereby lighten the electro-optic element 38. The position of the mirror assembly 34 (e.g., the first position 42 or the second position 46) may correspond with a signal to the controller 162 to darken and/or lighten the electro-optic element 38.

According to various aspects, the imager 50 may be automatically and/or manually adjusted to adjust the field of view 136 and the corresponding captured image data. The driver, or another occupant of the vehicle 14, may input a signal to the controller 162 via the user interface to adjust the field of view 136. The adjustment of the field of view 136 may include, for example, a position of the field of view 136 relative to the vehicle 14, a size of the field of view 136, clarity of the captured image data, combinations thereof, and/or other aspects of the imager 50. The imager 50 may include one or more lenses to focus the imager 50 and increase the clarity of the captured image data. Additionally or alternatively, the imager 50 may include the one or more lenses which may allow for adjustment of the size and/or direction of the field of view 136. The adjustment of the field of view 136 may be accomplished manually by an input from the driver or occupant of the vehicle 14 in response to the images on the display assembly 178. Additionally or alternatively, the controller 162 may at least partially process the captured image data from the imager 50 and determine which adjustments can be implemented to increase the quality and/or clarity displayed images. In this way, the controller 162 can automatically adjust the field of view 136 to improve the accuracy of the captured image data within the blind spot zone 54.

Referring to FIGS. 1-11, in operation, the mirror assembly 34 and the housing 58 rotate around the imager 50 between the first and second positions 42, 46. The exterior mirror assembly 10 may include a spring and detent assembly to retain the mirror assembly 34 in the first and second positions 42, 46. The rotation of the mirror assembly 34 can be manual or automatic. In manual examples, a user can rotate the mirror assembly 34 and lock the mirror assembly 34 into a selected position. In automatic examples, the rotation of the mirror assembly 34 may be accomplished through a motorized assembly, such that the driver of the vehicle 14 can adjust the position of the mirror assembly 34 from within the vehicle 14. The reflective surface of the mirror assembly 34 provides the field of view 146 to the driver of the vehicle 14, leaving the blind spot zone 54 outside the field of view 146. The field of view 136 of the imager 50 provides captured image data of the blind spot zone 54 to be displayed on the display assembly 178. The field of view 136 of the imager 50 is substantially constant, whether the mirror assembly 34 is in the first position 42, the second position 46, or any position therebetween. Stated differently, the field of view 146 of the mirror assembly 34 changes as the exterior mirror assembly 10 rotates, but the field of view 136 of the imager 50 does not change. The consistency of the field of view 136 of the imager 50 provides continual and consistent images to the display assembly 178 of the blind spot zone 54.

Use of the present device may provide for a variety of advantages. For example, the mirror assembly 34 may rotate between the first position 42 and the second position 46 to provide different field of views 146 of the mirror assembly 34 to the driver of the vehicle 14. Additionally, the imager 50 may at least partially, or completely, overlap with the blind spot zone 54 of the vehicle 14 and is configured to capture image data within the blind spot zone 54. Moreover, the captured image data from the field of view 136 of the imager 50, including images from the blind spot zone 54, may be communicated to the display assembly 178 for display to the driver of the vehicle 14. Further, the field of view 136 of the imager 50 remains substantially constant, which may provide consistent imaging to the driver of the object within the blind spot zone 54 of the vehicle 14. Additional benefits or advantages of using this device may also be realized and/or achieved.

According to at least one aspect of the present disclosure, a monitoring system for a vehicle includes a housing rotatable relative to said vehicle between a horizontal position and a vertical position. A mirror assembly is coupled to the housing. The mirror assembly includes a rearview mirror having a reflective field of view. An imager is disposed between the housing and the mirror assembly. The imager captures image data within a field of view. A controller is communicatively coupled to the imager. The controller receives captured image data from the imager. A display assembly is communicatively coupled to the controller. The controller converts the image data for display on the display assembly According to another aspect, the reflective field of view when the housing is in the horizontal position is different than the reflective field of view when the housing is in the vertical position. The field of view of the imager is the same when the housing is in the horizontal position and the vertical position.

According to another aspect, the reflective field of view encompasses a first area adjacent to said vehicle. The field of view of the imager encompasses a second area that extends outwardly from the first area relative to a side of said vehicle.

According to another aspect, the housing defines an arced aperture. The imager is disposed within the arced aperture. A position of the imager within the arced aperture changes based on a position of the housing.

According to another aspect, a temperature sensor is coupled to the housing. A heater is operably coupled to at least one of the mirror assembly and the housing. The controller activates the heater in response to a sensed temperature received from the temperature sensor.

According to another aspect, the housing defines an opening and the mirror assembly fills the opening. The mirror assembly includes a planar outer surface.

According to another aspect, an exterior mirror assembly for a vehicle includes an arm having a proximal end coupled with a vehicle door and a distal end. A mirror assembly is coupled to the arm. The mirror assembly includes an electro-optic element. The mirror assembly is rotatable about the distal end between first and second positions. An imager is disposed proximate to the distal end and configured to capture image data within a blind spot zone of said vehicle.

According to another aspect, the housing includes a peripheral edge that defines an opening. The mirror assembly is coupled to the entire peripheral edge of the housing.

According to still another aspect, a first position is a horizontal position and a second position is a vertical position.

According to another aspect, the mirror assembly rotates about a horizontal axis.

According to yet another aspect, the imager is disposed proximate a horizontal axis.

According to another aspect, the imager defines a field of view when the mirror assembly is in the first and second positions that at least partially overlap a blind spot zone.

According to another aspect, the field of view remains constant as the mirror assembly rotates between first and second positions.

According to another aspect, a mirror assembly includes a support feature having a first end and a second end. A mirror assembly is rotatably coupled to the second end of the support feature. The mirror assembly includes an electro-optic element. The mirror assembly is rotatable between a first position having a first reflective field of view and a second position having a second reflective field of view. An imager is coupled to the support feature and configured to capture image data through the mirror assembly.

According to another aspect, a housing is coupled to the mirror assembly and rotatable between the first position and the second position. The housing is disposed in a space defined by a receiving portion of the support feature when in the first position. The housing extends at least partially beyond the second end of the support feature when the housing is in the second position. The imager is disposed in a first end of an aperture defined by the housing when the housing is in the first position and disposed at a second end of the aperture when the housing is in the second position.

According to another aspect, the first position is parallel to the support feature and the second position is perpendicular to the support feature.

According to another aspect, a display assembly operably coupled with the mirror assembly, wherein a portion of the mirror assembly displays the image data captured by the imager.

According to another aspect, a field of view of the imager remains constant as the mirror assembly rotates between the first and second positions.

According to another aspect, the mirror assembly rotates about a horizontal axis. The horizontal axis is orthogonal to the support feature.

According to another aspect, the mirror assembly rotates about a horizontal axis that extends at an angle relative to the support feature. The horizontal axis extends through the support feature at a first location and through the mirror assembly at a second location. The first location a different distance from the second end than the second location.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A monitoring system for a vehicle, comprising:
   a housing rotatable relative to said vehicle between a horizontal position and a vertical position;
   a mirror assembly coupled to the housing, wherein the mirror assembly includes a rearview mirror having a reflective field of view, and wherein the reflective field of view when the housing is in the horizontal position is different than the reflective field of view when the housing is in the vertical position;
   an imager disposed between the housing and the mirror assembly, wherein the imager captures image data within a field of view, and wherein the field of view of the imager is the same when the housing is in the horizontal position and the vertical position;
   a controller communicatively coupled to the imager, wherein the controller receives captured image data from the imager; and
   a display assembly communicatively coupled to the controller, wherein the controller converts the image data for display on the display assembly.

2. The monitoring system of claim 1, wherein the reflective field of view encompasses a first area adjacent to said vehicle, and the field of view of the imager encompasses a second area that extends outwardly from the first area relative to a side of said vehicle.

3. The monitoring system of claim 1, wherein the housing defines an arced aperture, wherein the imager is disposed within the arced aperture, and wherein a position of the imager within the arced aperture changes based on a position of the housing.

4. The monitoring system of claim 1, further comprising:
   a temperature sensor coupled to the housing; and
   a heater operably coupled to at least one of the mirror assembly and the housing, wherein the controller activates the heater in response to a sensed temperature received from the temperature sensor.

5. The monitoring system of claim 1, wherein the housing defines an opening and the mirror assembly fills the opening, and wherein the mirror assembly includes a planar outer surface.

6. An exterior mirror assembly for a vehicle, comprising:
   an arm including a proximal end coupled with a vehicle door and a distal end;
   a mirror assembly coupled to the arm, wherein the mirror assembly includes an electro- optic element, and wherein the mirror assembly is rotatable about the distal end between first and second positions; and
   an imager disposed proximate to the distal end and configured to capture image data within a blind spot zone of said vehicle, wherein the imager defines a field of view when the mirror assembly is in the first and second positions that at least partially overlaps the blind spot zone, and wherein the field of view remains constant as the mirror assembly rotates between the first and second positions.

7. The exterior mirror assembly of claim 6, further comprising:
   a housing including a peripheral edge that defines an opening, wherein the mirror assembly is coupled to the entire peripheral edge of the housing.

8. The exterior mirror assembly of claim 6, wherein the first position is a horizontal position and the second position is a vertical position.

9. The exterior mirror assembly of claim 6, wherein the mirror assembly rotates about a horizontal axis.

10. The exterior mirror assembly of claim 9, wherein the imager is disposed proximate the horizontal axis.

11. A mirror assembly, comprising:
   a support feature having a first end and a second end;
   a mirror assembly rotatably coupled to the second end of the support feature, wherein the mirror assembly includes an electro-optic element, and wherein the mirror assembly is rotatable between a first position having a first reflective field of view and a second position having a second reflective field of view;
   an imager coupled to the support feature and configured to capture image data through the mirror assembly, wherein the mirror assembly rotates around the imager; and
   a housing coupled to the mirror assembly and rotatable between the first position and the second position, wherein the housing is disposed in a space defined by a receiving portion of the support feature when in the first position, wherein the housing extends at least partially beyond the second end of the support feature when the housing is in the second position, and wherein the imager is disposed in a first end of an aperture defined by the housing when the housing is in the first position and disposed at a second end of the aperture when the housing is in the second position.

12. The mirror assembly of claim 11, wherein the first position is parallel to the support feature and the second position is perpendicular to the support feature.

13. The mirror assembly of claim 11, further comprising:
   a display assembly operably coupled with the mirror assembly, wherein a portion of the mirror assembly displays the image data captured by the imager.

14. The mirror assembly of claim 11, wherein a field of view of the imager remains constant as the mirror assembly rotates between the first and second positions.

15. The mirror assembly of claim 11, wherein the mirror assembly rotates about a horizontal axis, and wherein the horizontal axis is orthogonal to the support feature.

16. The mirror assembly of claim 11, wherein the mirror assembly rotates about a horizontal axis that extends at an angle relative to the support feature, wherein the horizontal axis extends through the support feature at a first location and through the mirror assembly at a second location, and wherein the first location a different distance from the second end than the second location.

* * * * *